United States Patent
Chen et al.

(10) Patent No.: US 8,150,855 B2
(45) Date of Patent: Apr. 3, 2012

(54) PERFORMING AN EFFICIENT IMPLICIT JOIN OF MULTIPLE MIXED-TYPE RECORDS

(75) Inventors: Shawfu Chen, New Milford, CT (US); Adris E. Hoyos, Poughkeepsie, NY (US); Kevin T. Jones, Poughkeepsie, NY (US); Bernard Klos, Victor, NY (US); Aleksandr Krymer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/345,663

(22) Filed: Dec. 30, 2008

(65) Prior Publication Data

US 2010/0169307 A1 Jul. 1, 2010

(51) Int. Cl.
*G06F 7/00* (2006.01)
*G06F 17/30* (2006.01)

(52) U.S. Cl. ........ 707/741; 707/755; 707/769; 707/791; 707/802; 707/956

(58) Field of Classification Search .................. 707/705, 707/736, 737, 741, 755, 758, 769, 790, 791, 707/792, 802, 803, 812, 953, 956
See application file for complete search history.

(56) References Cited

U.S. PATENT DOCUMENTS

| | | | | |
|---|---|---|---|---|
| 5,625,813 | A * | 4/1997 | Venn | 395/602 |
| 5,701,460 | A * | 12/1997 | Kaplan et al. | 707/748 |
| 6,240,418 | B1 * | 5/2001 | Shadmon | 707/696 |
| 7,117,229 | B2 * | 10/2006 | Marshall et al. | 707/200 |
| 7,490,112 | B1 * | 2/2009 | Suresh et al. | 707/201 |
| 7,596,625 | B2 * | 9/2009 | Manion et al. | 709/232 |
| 2005/0234954 | A1 * | 10/2005 | Bailey et al. | 707/101 |
| 2008/0091704 | A1 * | 4/2008 | Yennie | 707/102 |

* cited by examiner

*Primary Examiner* — Marc Somers
(74) *Attorney, Agent, or Firm* — John E. Campbell; Ido Tuchman

(57) ABSTRACT

A method, system, method and computer program product for retrieving data. Records are retrieved from a hierarchical database. The records are categorized into a plurality of record types. Each record comprises a unique identifier field. A record map contains zero or more entries. Each entry comprises an identifying value, data from at least one record and a set of Boolean flags. Each flag corresponds to a record type. A computer iterates over the retrieved records. Data from each record is stored at an entry in the record map having an identifying value equal to the value included in the unique identifier field of the record. Moreover, the flag in this entry which corresponds to the record type of the record is set. Inner joins and outer joins are then performed using the contents of the record map.

20 Claims, 5 Drawing Sheets

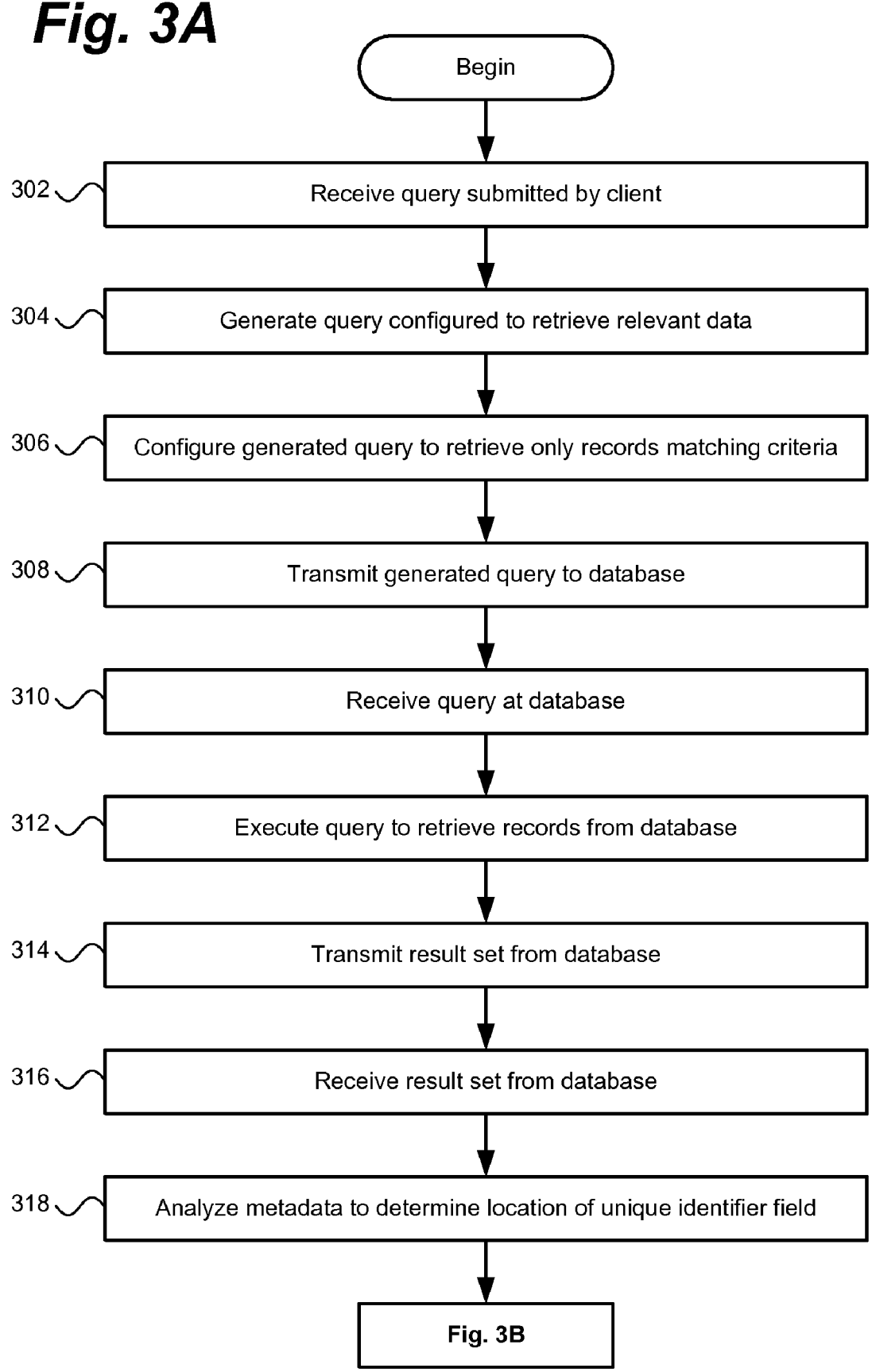

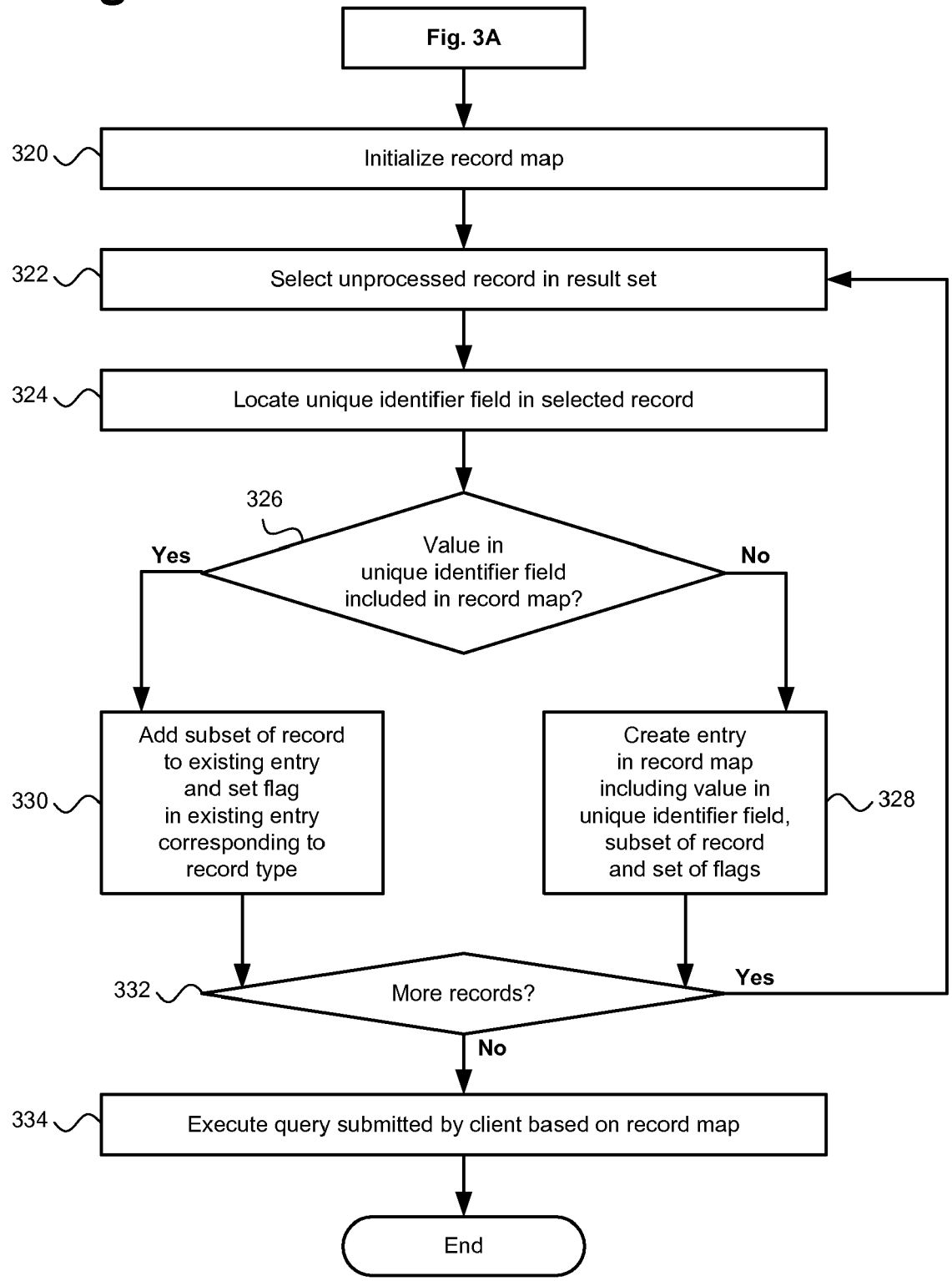

PERFORMING AN EFFICIENT IMPLICIT JOIN OF MULTIPLE MIXED-TYPE RECORDS

FIELD OF THE INVENTION

The present invention relates generally to databases. More specifically, the present invention relates to techniques for efficiently joining multiple mixed-type records retrieved from a hierarchical database.

BACKGROUND

A database is a system for storing and managing data. A database may store quantities of data which are potentially very large. Diverse types of data may be stored at the same database. In most databases, relationships between different elements of data stored at the database exist. Notably, such relationships may exist between data elements having different data types. To allow systems external to the database to access data located at the database, databases generally include functionality to process queries. A query is a request to retrieve specified data located at a database and to transmit the retrieved data to the entity which submitted the query.

Many databases known in the art organize data according to a hierarchical paradigm. A database organizing data in this manner is known as a hierarchical database. In a hierarchical database, parent-child relationships exist between different data elements stored at the database. A given data element may have a plurality of data elements as children. However, a given data element may have at most one data element as a parent. These parent-child relationships may define one or more tree structures. It is emphasized that a data element may have a parent, a child, or both which is of a different data type.

SUMMARY OF THE INVENTION

The present invention introduces techniques for efficiently joining multiple mixed-type records retrieved from a hierarchical database. Records are retrieved from a hierarchical database. The retrieved records may be relevant to a query submitted by a client. Each of the retrieved records is categorized into a record type and has a unique identifier field. A record map is populated by iterating over the retrieved records. The record map associates each identifying value included in one or more unique identifier fields with data from each record having the identifying value. Moreover, for each record, a flag in the record map corresponding to the record type of the record and is associated with the identifying value included in the unique identifier field of the record is set. Inner joins and outer joins can then be performed using the contents of the record map. The query submitted by the client can then be answered based on the result of any inner joins and outer joins thus performed. Notably, the query submitted by the client may be processed using a single pass through the database. Thus, resource requirements for processing the query and any joins included therein are beneficially reduced.

Thus, one example aspect of the present invention is a method for retrieving data. The method comprises retrieving a plurality of records from a hierarchical database. The plurality of records is categorized into a plurality of record types. Each record included in the plurality of records comprises a unique identifier field. The method further comprises iterating over each record included in the retrieved plurality of records. Iterating over each record is performed at a computer. The method further comprises creating an entry in a record map for each record for which a value contained in the unique identifier field is not included in the record map. The created entry comprises the value contained in the unique identifier field, a subset of the record and a set of flags. Each flag included in the set of flags corresponds to a record type. Moreover, each flag included in the set of flags is set to a first Boolean value if the record is of the type corresponding to the flag and a second Boolean value if the record is not of the type corresponding to the flag. The method further comprises, for each record for which the value contained in the unique identifier field is included in an existing entry in the record map, adding a subset of the record to the existing entry and setting the flag included in the existing entry and corresponding to the record type of the record to the first Boolean value.

Another example aspect of the present invention is a system for retrieving data. The system comprises a retrieving unit configured to retrieve a plurality of records from a hierarchical database. The plurality of records is categorized into a plurality of record types. Each record included in the plurality of records comprises a unique identifier field. The system further comprises a record map containing zero or more entries. Each entry stored at the record map comprises an identifying value, a subset of at least one record and a set of flags. Each flag included in the set of flags corresponds to a record type. The system further comprises a processor. The processor is configured to iterate over each record included in the plurality of records retrieved by the retrieving unit. The processor is further configured to create an entry in the record map for each record for which a value contained in the unique identifier field is not included in the record map. The created entry comprises the value contained in the unique identifier field, a subset of the record and a set of flags. Each flag included in the set of flags corresponds to a record type. Moreover, each flag included in the set of flags is set to a first Boolean value if the record is of the type corresponding to the flag and a second Boolean value if the record is not of the type corresponding to the flag. The processor is further configured to, for each record for which the value contained in the unique identifier field is included in an existing entry in the record map, add a subset of the record to the existing entry and set the flag included in the existing entry and corresponding to the record type of the record to the first Boolean value.

Another example aspect of the present invention is a computer program product embodied in a computer usable memory comprising computer readable program codes coupled to the computer usable memory for retrieving data. The computer readable program codes are configured to cause the program to retrieve a plurality of records from a hierarchical database. The plurality of records is categorized into a plurality of record types. Each record included in the plurality of records comprises a unique identifier field. The computer readable program codes are further configured to cause the program to iterate over each record included in the retrieved plurality of records. The computer readable program codes are further configured to cause the program to create an entry in a record map for each record for which a value contained in the unique identifier field is not included in the record map. The created entry comprises the value contained in the unique identifier field, a subset of the record and a set of flags. Each flag included in the set of flags corresponds to a record type. Moreover, each flag included in the set of flags is set to a first Boolean value if the record is of the type corresponding to the flag and a second Boolean value if the record is not of the type corresponding to the flag. The computer readable program codes are further configured to cause the program to, for each record for which the value contained in the unique identifier field is included in an existing entry in the record map, add a subset of the record to the existing entry and set the flag included in the existing entry and corresponding to the record type of the record to the first Boolean value.

The foregoing and other features, utilities and advantages of the invention will be apparent from the following more particular description of various embodiments of the invention as illustrated in the accompanying drawings.

BRIEF DESCRIPTION OF THE DRAWINGS

FIGS. 3A and 3B demonstrate an example sequence of operations for retrieving data according to the present invention.

DETAILED DESCRIPTION OF THE INVENTION

Figure 1:
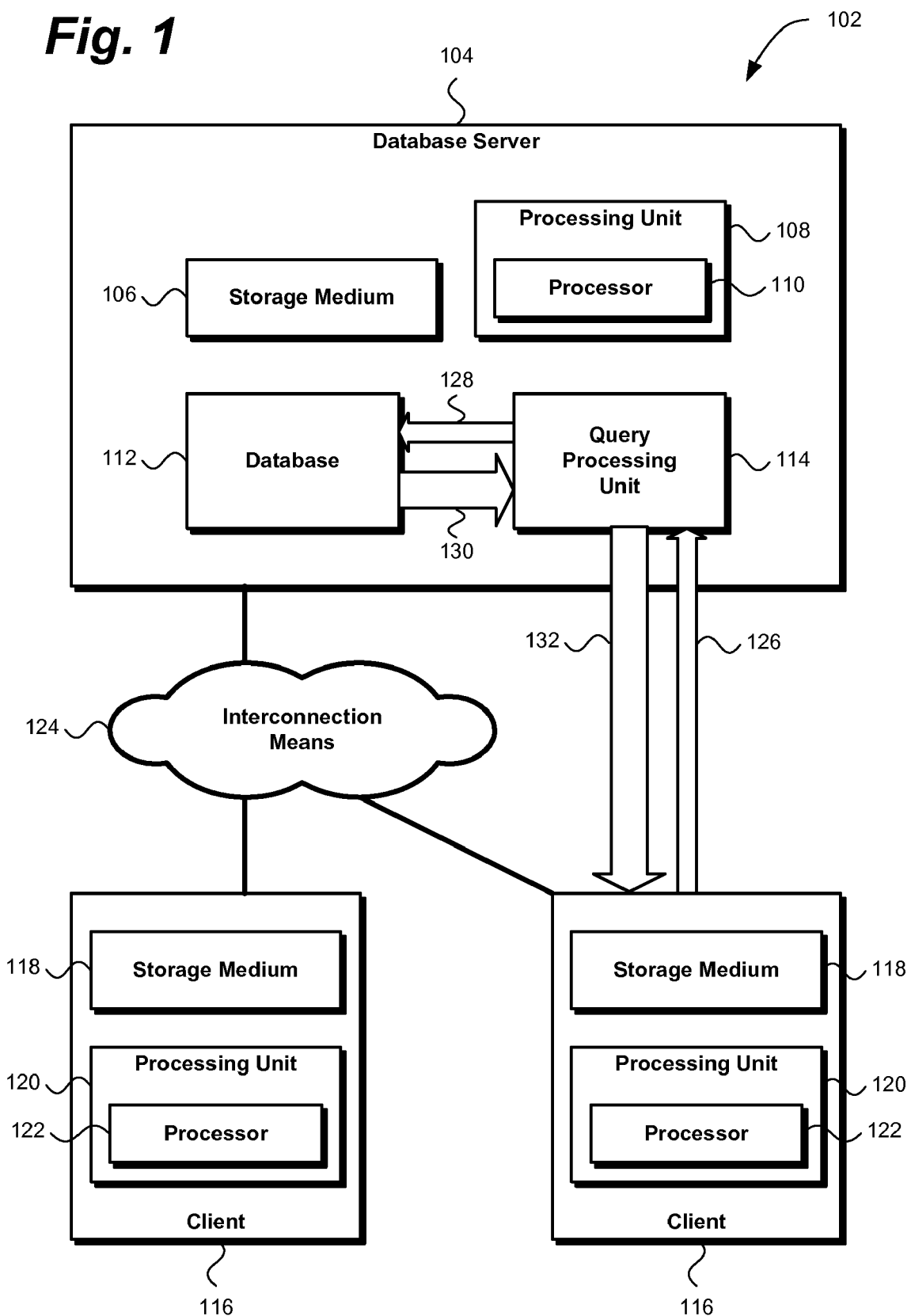
FIG. 1 shows an example environment embodying the present invention.

The following description details how the present invention is employed to retrieve data. Throughout the description of the invention reference is made to FIGS. 1-4. When referring to the figures, like structures and elements shown throughout are indicated with like reference numerals.

FIG. 1 shows an example environment 102 embodying the present invention. It is initially noted that the environment 102 is presented for illustration purposes only, and is representative of countless configurations in which the invention may be implemented. Thus, the present invention should not be construed as limited to the environment configurations shown and discussed herein.

The environment 102 includes a database server 104. A database server may be any of a wide variety of systems configured to store and manage data. The database server 104 may be a general purpose computer. Such a computer may incorporate any of a wide variety of architectures. The computer, even if originally manufactured for a general purpose, may be configured specifically to process large quantities of data. The computer may be based on a general purpose operating system such as the IBM® z/OS® operating system, the IBM AIX® operating system, the Linux® operating system, any flavor of the UNIX® operating system or the Windows® operating system. IBM, z/OS and AIX are registered trademarks of 1International Business Machines Corporation, Armonk, N.Y., United States, in the United States, other countries, or both. Linux® is the registered trademark of Linus Torvalds in the United States and other countries. UNIX is a registered trademark of The Open Group. Windows is a registered trademark of Microsoft Corporation, Redmond, Wash., United States, in the United States and/or other countries. The computer may also be based on a special purpose operating system such as the IBM z/Transaction Processing Facility Enterprise Edition operating system. A database server may also be manufactured for the specific purpose of storing and managing data. Moreover, a database server may incorporate any of a wide variety of computer program products.

The database server 104 may comprise a storage medium 106 configured to store data in a computer usable format. The storage medium may comprise any of a variety of technological devices configured to store data. Such technological devices may include without limitation hard drives, optical drives, floppy drives, random access memory (RAM), read-only memory (ROM), and erasable programmable read-only memory (EPROM or Flash memory).

The database server 104 may further comprise a processing means 108 embedded in hardware, software or a combination thereof. The processing means may comprise one or more processors 110. Specifically, a processor comprised by the processing means may be a general purpose microprocessor. Each processor comprised by the processing means is configured to execute program code.

The database server 104 may be connected to a variety of peripheral devices. Such peripheral devices may include a keyboard, a mouse and a display.

In an embodiment of the present invention, the database server 104 is an IBM zSeries® server executing the IBM z/TPF operating system. zSeries is a registered trademark of 1International Business Machines Corporation, Armonk, N.Y., United States, in the United States, other countries, or both.

The database server 104 executes a database 112. The database may be any of a variety of systems configured to store and manage data. The database may be implemented in hardware, software or a combination thereof. The data manipulated by the database may be stored at the storage medium 106. The database is further configured to process queries by searching for data matching the queries and returning the matching data. The database may additionally be configured to perform other tasks to manage the data stored thereat. The database 112 may perform any or all of the preceding tasks by causing instructions to be executed by the processing unit 108. Thus, the database may configure one or more processors 110 included in the processing means to perform any or all of the preceding tasks. In an embodiment of the present invention, the database is a hierarchical database.

In an embodiment of the present invention, the database 112 is an IBM z/TPF Database Facility database. The z/TPFDF database is a hierarchical database. A z/TPFDF database includes one or more subfiles. Each subfile contains zero or more records. A record in a z/TPFDF database is known as an LREC (Logical RECord). A z/TPFDF database may define one or more record types. A record type defines a set of fields and specifies the type of data which each field may contain. Each LREC is categorized as being of a specified record type. An LREC categorized as being of a record type contains the fields defined by that record type. It is noted that a single subfile may contain records having different record types.

It is emphasized that the present invention is not limited to z/TPFDF databases. As used herein, the term "subfile" includes a z/TPFDF subfile and also includes any other defined subset of a database. Moreover, as used herein, the term "record" includes a z/TPFDF LREC and also includes any database record as the term is normally used in the art. Furthermore, as used herein, the term "record type" includes any definition wherein all records categorized as being of a specified record type share a common set of fields defined by the specified record type.

It is further emphasized that different record types may specify different layouts and fields. Thus, records having different record types may have different layouts and fields. Moreover, the actual data contained in records may vary even among records categorized as being of the same record type.

The example database 112 shown in FIG. 1 includes a subfile containing information about orders placed at an online store. The subfile contains records of two different record types. The first record type defines a customer record. Each customer record contains information about one customer of the online store. The customer record type may specify fields included in each customer record such as a customer ID, user name, Social Security Number (SSN) and the like. The customer ID is a unique numeric identifier which identifies a specific customer.

The second record type defines a purchase record. Each purchase record contains information about one purchase made at the online store. The purchase record includes a field containing the customer ID of the customer who made the purchase. If a purchase record and a customer record have the same value in the customer ID field, the customer represented by the customer record made the purchase represented by the purchase record. A purchase record does not, however, contain a unique identifier which is distinct from the customer ID. It is noted that each purchase is associated with exactly one customer. Therefore, each purchase record contains exactly one customer ID.

A purchase record does not, however, include any other information pertaining to the customer. Therefore, to retrieve all of the information about a purchase, it is necessary to combine the contents of the purchase record with the contents of the customer record having a customer ID equal to the customer ID included in the purchase record.

In this example, the unique identifier, namely the customer ID, may be thought of as being shared between the customer record and the purchase record. It is noted that the present invention does not require this condition to hold. The present invention may retrieve data from a database regardless of whether or not a child record has a unique identifier which is distinct from the unique identifier of its parent record.

The environment 102 further includes a query processing unit 114. The query processing unit interfaces with the database 112 to facilitate efficient querying of the database. The query processing unit may be implemented in hardware, software or a combination thereof.

In an embodiment of the present invention as shown in FIG. 1, the query processing unit 114 is implemented in software executing at the database server 104 but separate from the database 112. In another embodiment of the present invention, the query processing unit is integrated into the database. In either of these two embodiments, the query processing unit may read data from, and write data to, the storage medium 106. Similarly, the query processing unit may cause instructions to be executed by the processing unit 108 and/or one or more processors 110 included therein.

In another embodiment of the present invention, the query processing unit 114 is implemented in software executed at a computing system other than the database server. Such a computing system may include a storage medium and processing unit similar to those included in the database server. The query processing unit may thus read data from, and write data to, the storage medium included in the computing system executing the query processing unit. Similarly, the query processing unit may cause instructions to be executed by the processing unit included in the computing system executing the query processing unit and/or by one or more processors included therein.

In another embodiment of the present invention, the query processing unit 114 is implemented in hardware, either in whole or in part.

The environment 102 further includes one or more clients 116. A client may be any technological device configured to submit queries to a database 112.

A client 116 may be a general purpose computer. Such a computer may incorporate any of a wide variety of architectures. The computer may be based on a general purpose operating system such as the IBM z/OS operating system, the IBM AIX operating system, the Linux operating system, any flavor of the UNIX operating system or the Windows operating system. A client may also be a device other than a general purpose computer. Such devices may include hardware devices manufactured to perform a specific task. Such devices may also include personal digital assistants (PDA's) and mobile telephones. It is noted that the clients may be heterogeneous. Specifically, they may differ from each other in architecture, operating system or other important respects.

A client 116 may incorporate and execute any of a wide variety of computer program products. The computer program products may be applications. More specifically, the applications may be database applications. Any or all of these computer program products and applications may be configured to submit queries to a database 112.

A client 116 may comprise a storage medium 118 configured to store data in a computer usable format. The storage medium may comprise any of a variety of technological devices configured to store data. Such technological devices may include without limitation hard drives, optical drives, floppy drives, random access memory (RAM), read-only memory (ROM), and erasable programmable read-only memory (EPROM or Flash memory).

A client 116 may further comprise a processing unit 120 embedded in hardware, software or a combination thereof. The processing unit may comprise one or more processors 122. Specifically, a processor comprised by the processing unit may be a general purpose microprocessor. Each processor comprised by the processing unit is configured to execute program code.

The client 116 may be connected to a variety of peripheral devices. Such peripheral devices may include a keyboard, a mouse and a display.

The environment 102 further includes an interconnection unit 124. The interconnection unit may be any of a wide variety of systems known in the art for allowing two or more systems to communicate. The interconnection unit may comprise any of a wide variety of networks such as the Internet, the public switched telephone network (PSTN), local area networks (LAN's) and wide area networks (WAN's). The interconnection unit may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The interconnection unit may include various topologies and protocols known to those skilled in the art, such as TCP/IP, UDP, and Voice over Internet Protocol (VoIP). The interconnection unit may comprise direct physical connections, radio waves, microwaves or any combination thereof. Furthermore, the interconnection unit may include various networking devices known to those skilled in the art, such as routers, switches, bridges, repeaters, etc.

It is noted that the interconnection unit is not essential in some configurations of the present invention. For example, a client 116 may be connected to the database server 104 via a direct hardware connection.

A client 116 may transmit a client query 126. The query requests the retrieval of data located at the database 112. The query may specify one or more subfiles or other locations within the database from which data are to be returned. Furthermore, the query may specify one or more search criteria. A search criterion is a condition which should hold true for data returned in response to the query. Thus, the result of the query is filtered to include only records matching all search criteria specified by the query.

Notably, a query may comprise one or more joins. A join combines multiple record types. Each record type has a specified field. The join may specify which field is the specified field. Alternatively, the specified field may be defined implicitly. It is emphasized that the specified field may contain a unique identifier. Records of different types are combined where they have a common value in the specified field for each record type included in the join. When records of different types are combined, the fields contained in each of the combined records may be combined into a single record. This combined record may then be included in the result set of the query if it meets all search criteria specified by the query.

Two of the most common types of joins are inner joins and outer joins. Generally, in an inner join, for each combination of records including one record of each of the joined record types wherein the specified field of each record contains the same value, a record including the data from all of the records is included in the result of the join. In an outer join, the result of the join includes all combinations of records as previously described. However, the result of an outer join may additionally include records of any of the joined record types for which the specified field does not contain the same value as the specified field of any record of another of the joined record types. In this case, the record is included in the result of the join without being combined with another record. It is noted that the specific outer join previously described is known in the art as a full outer join. Other types of outer joins known in the art include left outer joins and right outer joins. More generally, those skilled in the art will appreciate that variations on the inner joins and outer joins previously described are possible.

In an embodiment of the present invention as shown in FIG. 1, the client 116 transmits the client query 126 to the query processing unit 114. In another embodiment of the present invention, the client transmits a client query to the database 112. However, the client query is intercepted by the query processing unit and processed thereby.

In the example environment shown in FIG. 1, the client query 126 transmitted by the client 116 requests information regarding all purchases made at the online store. Customer information relating to each purchase is additionally requested by the client query 126. Accordingly, the client query 126 requests that an inner join is performed on customer records and purchase records based on the customer ID field found in both record types. Specifically, the customer ID field is the specified field for both the customer record type and the purchase record type.

It is noted that operations described below as performed by the query processing unit 114 may be performed by a sub-component of the query processing unit as described below in regard to FIG. 2.

The query processing unit 114 then transmits at least one intermediate query 128 to the database. The intermediate query or intermediate queries 128 request the retrieval of data relevant to the client query 126 transmitted by the client 116. If the client query 126 transmitted by the client comprises one or more joins, the intermediate query or intermediate queries 128 transmitted by the query processing unit may omit any such joins.

In the example environment shown in FIG. 1, the query processing unit 114 configures the intermediate query 128 to request the retrieval of all customer records and all purchase records. However, the intermediate query 128 is not configured to specify that the customer records and purchase records are to be joined to each other.

The database 112 then processes the intermediate query 128 transmitted by the query processing unit 114. Processing the intermediate query 128 comprises searching for data matched by the query 128. Any data thus matched is included in a result set 130 transmitted to the query processing unit.

In the example environment shown in FIG. 1, the database 112 searches the subfile pertaining to orders at the online store for customer records and purchase records. All of the customer records found in the subfile, and all of the purchase records found in the subfile, are included in the example result set 130.

The query processing unit 114 then receives the result set 130 transmitted by the database 112. If the client query 126 transmitted by the client 116 included a join, the query processing unit applies the join to the received result set 130. Applying the join results in a joined result set 132. The joined result set 132 is then transmitted to the client which transmitted the client query 126. It is contemplated that the joined result set 132 fulfills the requirements specified by the client query 126 transmitted by the client.

In the example environment shown in FIG. 1, the query processing unit 114 performs an inner join on the customer records and the purchase records included in the example result set 130 received from the database 112. The inner join associates the records based on the customer ID found in each record. The example joined result set 132 includes the result of the inner join. Again, each purchase is associated with exactly one customer. Accordingly, the example joined result set 132 includes one record for each purchase record included in the example result set 130 received from the database. Each record included in the example joined result set 132 includes both the contents of the corresponding purchase record and the contents of the customer record having the same customer ID as the corresponding purchase record.

Figure 2:
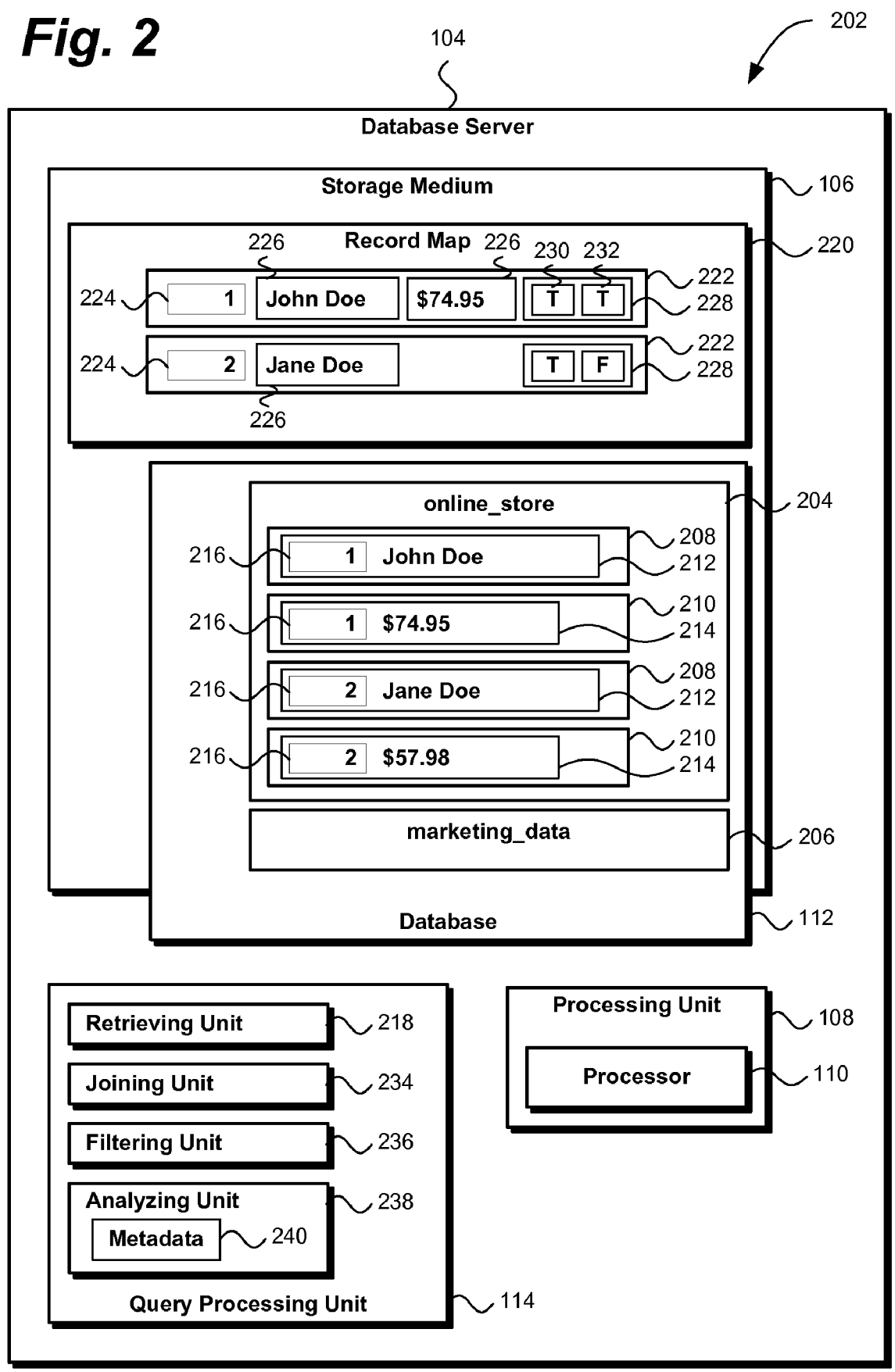
FIG. 2 illustrates an example system for retrieving data according to the present invention.

Turning now to FIG. 2, an example system 202 for retrieving data according to the present invention is illustrated. The system 202 shown in FIG. 2 may exist within an environment such as the example environment shown in FIG. 1. Notably, system 202 includes a database 112, a database server 104, a storage medium 106, a processing unit 108, and at least one processor 110. As discussed above, the database may be a hierarchical database.

The database 112 may be a computer or may be comprised by a computer. The database may achieve any of the operations performed thereby by causing instructions to be executed by a processing unit such as the example processing unit 108 comprised by the database server 104, a processor 110 such as the example processor comprised by the example processing unit, or both. Moreover, the database may, in performing any of the operations performed thereby, read data from, and write data to, a storage medium such as the storage medium 106 comprised by the database server.

The database 112 includes one or more subfiles 204, 206. The example database shown in FIG. 2 includes two subfiles. The first subfile 204, named online_store, contains information about an online store. The second subfile 206, named marketing_data, contains results of marketing surveys.

Each subfile 204, 206 includes zero or more records 208, 210. Each record is categorized as being of a specific record type. The present invention allows a single subfile of the database to include records categorized as being of different record types. Some databases known in the art, such as the z/TPFDF database, similarly allow a single subfile of the database to include records categorized as being of different record types.

In the example database 112 shown in FIG. 2, the online_store subfile 204 includes a plurality of records 208, 210. A record stored in this subfile may be of either the customer record type 208 or the purchase record type 210.

Both record types are as defined above in regards to FIG. 1. Each record of the customer record type includes a first set of fields 212. Each record of the purchase record type includes a second set of fields 214.

The present invention does not require the records 208, 210 of a record type to be grouped together in any manner. To the contrary, the present invention allows records of different record types to be interleaved in an arbitrary order within a subfile 204, 206. Some databases known in the art, including the z/TPFDF database, similarly allow records of different record types to be interleaved in an arbitrary order within a subfile. Thus, in the example database shown in FIG. 2, customer records 208 and purchase records 210 are interleaved in an arbitrary order within the online_store subfile 204.

In a z/TPFDF database, the record type of each LREC is normally stored at the LREC itself. Specifically, a record ID may be stored at the LREC to indicate the record type of the LREC. Records having the same record ID are categorized as being of the same record type. The record ID is a field which is one byte in length. For example, the record ID may contain the values 0×80 or 0×A0. Other databases known in the art may also store a record ID or other indication of a record type at each record. Thus, in the example database 112 shown in FIG. 2, each customer record 208 contains a first record ID value. Each purchase record 210 contains a second record ID value.

Each record 208, 210 in the database comprises a unique identifier field 216. The unique identifier field may also be referred to as a unique key. Records have a unique identifier field regardless of their record type. However, the unique identifier field may be a different field for each record type.

The present invention does not require that the unique identifier fields 216 are associated via foreign keys. It is sufficient for associated records to contain the same value in their corresponding unique identifier fields. The example database 112 shown in FIG. 2 does not contain foreign keys. Instead, customer records 208 and purchase records 210 are logically associated whenever a customer record and a purchase record have the same value in the customer ID field.

The present invention additionally does not require that any particular hierarchical relationship exists among the record types included in the database. In the example database 112 shown in FIG. 2, no parent-child or other hierarchical relationship exists between customer records 208 and purchase records 210.

It is noted that while the examples used herein have only one unique identifier field per record, the number of unique identifier fields per record is not inherently limited to one. To the contrary, it is contemplated that those of ordinary skill in the art can modify the present invention to interact with databases having more than one unique identifier field per record.

In the example database shown in FIG. 2, both customer records 208 and purchase records 210 include a field named customer_id 216. This field contains a numeric identifier which uniquely identifies a customer of the online store. For a customer record, the customer_id field is unique across all customer records in the database. For a purchase record, the customer_id field identifies the customer who made the purchase. Thus, if the same customer has made multiple purchases at the online store, the same value may exist in the customer_id field of multiple purchase records.

It is noted that while the unique identifier field is the same field for both record types in this example, the present invention does not require this condition to hold. To the contrary, different record types may have different unique identifier fields. However, the records are joined due to having the same value in the differing unique identifier fields in this case.

The data stored at the database 112, including the subfiles 204, 206 and the records 208, 210 contained therein, may be stored at a storage medium such as the storage medium 106 located at the database server 104.

The system further comprises a retrieving unit 218. The retrieving unit may be implemented in hardware, software or a combination thereof. The retrieving unit may be a computer or may be comprised by a computer. The retrieving unit may achieve any of the operations performed thereby by causing instructions to be executed by a processing unit such as the example processing unit 108 comprised by the database server 104, a processor 110 such as the example processor comprised by the example processing unit, or both. Moreover, the retrieving unit may, in performing any of the operations performed thereby, read data from, and write data to, a storage medium such as the example storage medium 106 comprised by the database server. In an embodiment of the present invention, the retrieving unit is comprised by the query processing unit 114 described below.

The retrieving unit is configured to retrieve a plurality of records 208, 210 from the hierarchical database 112. The retrieving unit may retrieve the records by generating a query configured to retrieve a plurality of records which are relevant to a query transmitted by a client. The retrieving unit may then cause this query to be executed at the database 112. Executing the query causes a record set to be retrieved from the database. The record set may include a single record, a plurality of records or no records.

As previously noted, each record 208, 210 stored at the database 112 is categorized as being of a specific record type. A database may include records categorized into a plurality of record types. If the retrieving unit 218 retrieves multiple records in processing a single query, it is not required for all of the records retrieved to be categorized as being of the same record type. Therefore, a plurality of records retrieved from the database by the retrieving unit may be categorized into a plurality of record types.

Again, each record 208, 210 stored at the database 112 comprises a unique identifier field 216. Therefore, each record retrieved from the database by the retrieving unit 218 comprises a unique identifier field 216. If the retrieving unit 218 retrieves from the database a result set including one or more records in response to a query, each record included in the result set comprises a unique identifier field.

The records retrieved by the retrieving unit 218 may be included in a single subfile included in the database 112. In the example system shown in FIG. 2, the system is processing the query transmitted by the client as previously discussed in regards to FIG. 1. Thus, the retrieving unit retrieves all of the customer records 208, as well as all of the purchase records 210. Both types of records are stored in a single subfile of the database, namely the online_store subfile 204. Thus, even though the retrieving unit retrieves multiple record types, all of the records are retrieved from a single subfile in this case.

The system 202 may process a query using a single pass through the database. As used herein, the term "single pass" means that in executing any given query, data included in the database, with the exception of indexes and metadata, is accessed at most one time. In the example described above, the retrieving unit can retrieve the data relevant to the query, namely all of the customer records 208 and all of the purchase records 210, by reading the entire online_store subfile 204. Even though it is necessary to read the entire subfile in this case, only a single pass is required.

The system 202 further comprises a record map 220. The record map contains zero or more entries 222. Each entry stored at the record map comprises an identifying value 224.

The identifying value was contained in the unique identifier field 216 for one or more records 208, 210. The identifying value is unique across all entries in the record map.

Each entry 222 stored at the record map 220 further comprises a subset of at least one record 226. The subset of at least one record may have been retrieved by the retrieval unit 218 into computer memory. To store this data, the entry may comprise an array. In an embodiment of the present invention, each subset of a record included in the entry is stored as an element in this array. In another embodiment of the present invention, a pointer to each subset of a record included in the entry is stored as an element in this array. It is emphasized that in this case, the subsets of the records are included in the entry by reference. It is noted that the latter embodiment advantageously increases efficiency, particularly in regards to memory utilization and processing speed. It is further noted that a subset of a record included in an entry may contain, in the unique identifier field 216 of the record, the identifying value 224 included in the entry.

As used herein, the term "subset" includes both a proper subset and an improper subset. Those skilled in the art will appreciate that an improper subset of a set is a subset including all elements included in the set. By contrast, a proper subset does not include all elements included in the set.

Each entry 222 stored at the record map 220 further comprises a set of flags 228. The set of flags may be referred to as an auxiliary array. The set of flags may be implemented as an array. wherein each flag is an element in the array. Each flag 230, 232 may be a Boolean value. Each flag included in the set of flags corresponds to a record type. Specifically, the set of flags may include a flag for each record type requested by a query. It is noted that the record types returned in response to a query are generally determinate based on the query and can generally be determined by analyzing the query. If the identifying value 224 included in the entry has been observed in a unique identifier field 216 of a record 208, 210 of the record type corresponding to a flag, the flag contains a first Boolean value. Otherwise, the flag contains a second Boolean value. It is contemplated that all flags in the set of flags for a new entry are initialized to the second Boolean value. In an embodiment of the present invention, the first Boolean value is True and the second Boolean value is False.

In the example system shown in FIG. 2, each entry 222 contained by the record map 220 comprises two flags. The first flag 230 corresponds to the customer record type. The second flag 232 corresponds to the purchase record type.

The record map 220 may be implemented using any of a variety of data structures known in the art. The record map may be located at a storage medium such as the storage medium 106 comprised by the database server 104.

The system further comprises a query processing unit 114. The query processing unit 114 may be the query processing unit of FIG. 1 and may have any of the properties described above in regards to FIG. 1. Notably, the query processing unit may be implemented in hardware, software or a combination thereof. The query processing unit may be a computer or may be comprised by a computer. The query processing unit may achieve any of the operations performed thereby by causing instructions to be executed by a processing unit such as the example processing unit 108 comprised by the database server 104, a processor 110 such as the example processor comprised by the example processing unit, or both. Moreover, the query processing unit may, in performing any of the operations performed thereby, read data from, and write data to, a storage medium such as the example storage medium 106 comprised by the database server.

The query processing unit 114 is configured to iterate over each record 208, 210 included in the plurality of records retrieved by the retrieving unit 218. The query processing unit is further configured to create an entry 222 in the record map 220 for each record for which a value contained in the unique identifier field 216 is not included in the record map. The created entry comprises the value contained in the unique identifier field, a subset of the record 226 and a set of flags 228. Each flag 230, 232 included in the set of flags correspond to a record type. Each flag included in the set of flags is set to the first Boolean value if the record is of the type corresponding to the flag and the second Boolean value if the record is not of the type corresponding to the flag. The query processing unit is further configured to, for each record for which the value contained in the unique identifier field is included in an existing entry in the record map, add a subset of the record to the existing entry and set the flag included in the existing entry and corresponding to the record type of the record to the first Boolean value.

As previously noted, the query processing unit 114 may achieve any of the operations performed thereby by causing instructions to be executed by one or more processors 110. As a result, at least one processor is configured to iterate over each record 208, 210 included in the plurality of records retrieved by the retrieving unit 218. The at least one processor is further configured to create an entry 222 in the record map 220 for each record for which a value contained in the unique identifier field 216 is not included in the record map. The created entry comprises the value contained in the unique identifier field, a subset of the record 226 and a set of flags 228. Each flag 230, 232 included in the set of flags corresponds to a record type. Each flag included in the set of flags is set to the first Boolean value if the record is of the type corresponding to the flag and the second Boolean value if the record is not of the type corresponding to the flag. The at least one processor is further configured to, for each record for which the value contained in the unique identifier field is included in an existing entry in the record map, add a subset of the record to the existing entry and set the flag included in the existing entry and corresponding to the record type of the record to the first Boolean value.

It is emphasized that as a result of these operations, each identifying value 224 is mapped to an array or set including subsets of records 226 for which the identifying value is included in the unique identifier field 216. These operations further result in each identifying value 224 being mapped to an array or set 228 of flags 230, 232 wherein each flag corresponds to a record type.

In the example record map 220 of FIG. 2, the query processing unit 114 has processed three records 208, 210. The first record processed is a customer record 208 including various fields. The fields contain a unique identifier field 216, namely the customer ID, containing the value 1. The fields additionally include a name field containing the value "John Doe". The customer ID of 1 has not yet been observed. Therefore, an entry 222 is created in the record map. The created entry contains 1 as the identifying value 224. The created entry further contains a subset of the customer record 226, including the name field containing the value "John Doe". A flag 230 in the created entry and corresponding to the customer record type is set to the first Boolean value. The other flag in the created entry, corresponding to the purchase record type, is set to the second Boolean value.

The second record processed is a purchase record 210 including various fields. The fields include a unique identifier field 216, namely the customer ID, containing the value 1. The fields additionally include a purchase amount field containing the value "$74.95". The customer ID of 1 has previously been observed. Therefore, the existing entry 222 in the record map 220 and containing the identifying value of 1 is updated. The subset of the customer record 226, including the purchase amount field containing the value "$74.95", is added to this existing entry. A flag 232 in the existing entry and corresponding to the purchase record type is set to the first Boolean value.

The third record processed is a customer record 208 including various fields. The fields include a unique identifier field 216, namely the customer ID, containing the value 2. The fields additionally include a name field containing the value "Jane Doe". The customer ID of 2 has not yet been observed. Therefore, another entry 222 is created in the record map. The created entry contains 2 as the identifying value 224. The created entry further contains a subset of the customer record 226, including the name field containing the value "Jane Doe". A flag 230 in the created entry and corresponding to the customer record type is set to the first Boolean value. The other flag in the created entry, corresponding to the purchase record type, is set to the second Boolean value.

The system 202 further comprises a joining unit 234. The joining unit may be implemented in hardware, software or a combination thereof. The joining unit may be a computer or may be comprised by a computer. The joining unit may achieve any of the operations performed thereby by causing instructions to be executed by a processing unit such as the example processing unit 108 comprised by the database server 104, a processor 110 such as the example processor comprised by the example processing unit, or both. Moreover, the joining unit may, in performing any of the operations performed thereby, read data from, and write data to, a storage medium such as the example storage medium 106 comprised by the database server. In an embodiment of the present invention, the joining unit is comprised by the query processing unit 114.

The joining unit is configured to perform join operations. Specifically, the joining unit 234 may be configured to perform an inner join. Performing the inner join comprises outputting the subsets of records 226 included in each entry 222 in the record map 220 for which all flags 230, 232 included in the set of flags 228 contain the first Boolean value.

The joining unit 234 may also be configured to perform an outer join. Performing the outer join comprises outputting the subsets of records 226 included in each entry 222 in the record map 220 for which at least one flag 230, 232 included in the set of flags 228 contains the first Boolean value.

The system 202 further comprises a filtering unit 236. The filtering unit may be implemented in hardware, software or a combination thereof. The filtering unit may be a computer or may be comprised by a computer. The filtering unit may achieve any of the operations performed thereby by causing instructions to be executed by a processing unit such as the example processing unit 108 comprised by the database server 104, a processor 110 such as the example processor comprised by the example processing unit, or both. Moreover, the filtering unit may, in performing any of the operations performed thereby, read data from, and write data to, a storage medium such as the example storage medium 106 comprised by the database server. In an embodiment of the present invention, the filtering unit is comprised by the query processing unit 114. In another embodiment of the present invention, the filtering unit is comprised by the retrieving unit 218.

As previously noted, a query may specify one or more search criteria. Accordingly, the filtering unit is configured to filter the plurality of records to include only records matching at least one criterion specified by a query. Specifically, the filtering unit may filter the plurality of records to include only records matching all search criteria specified by a query. Filtering the plurality of records is performed before iterating over each record included in the retrieved plurality of records. To achieve this goal, the filtering unit may cause any search criteria included in the query submitted by the client to be added to the query generated by the query processing unit 114. Thus, the plurality of records returned in response to the generated query will include only records matching this at least one search criterion.

The system 202 further comprises an analyzing unit 238. The analyzing unit may be implemented in hardware, software or a combination thereof. The analyzing unit may be a computer or may be comprised by a computer. The analyzing unit may achieve any of the operations performed thereby by causing instructions to be executed by a processing unit such as the example processing unit 108 comprised by the database server 104, a processor 110 such as the example processor comprised by the example processing unit, or both. Moreover, the analyzing unit may, in performing any of the operations performed thereby, read data from, and write data to, a storage medium such as the example storage medium 106 comprised by the database server. In an embodiment of the present invention, the analyzing unit is comprised by the query processing unit 114.

The analyzing unit is configured to analyze metadata 240 about the plurality of records 208, 210 to determine a location of the unique identifier field 216. The metadata may be expressed using Extensible Markup Language (XML). The metadata may be based on object code which specifies the format of the fields for one or more record types. The metadata may also specify the identity of, and provide information regarding, the unique identifier field or another unique key.

In an embodiment of the present invention, the analyzing unit 238 is comprised by the query processing unit 114 shown in FIG. 2. Thus, the metadata 240 may be stored at the analyzing unit as shown in FIG. 2.

In another embodiment of the present invention, the analyzing unit is comprised by a client such as any of the clients shown in FIG. 1. Thus, an indication of the determined location of the unique identifier field is included in each query submitted by the client.

In an embodiment of the present invention, an XML element named "<FIELD>" and included in the metadata 240 specifies information regarding a field in the subfile. The value of this element contains the name of the field. The following attributes, when present, specify additional information about the field:

An attribute named TYPE specifies the data type contained in the field. Possible values of TYPE include "hex" and "text".

An attribute named LEN specifies the length of the field. The length may be specified as a number of characters or bytes.

An attribute named DISP specifies the displacement of the field. The displacement may be a number of characters or bytes after the beginning of the record after which the field begins.

An attribute named VARIABLE contains a Boolean value specifying whether or not the field is variable.

An attribute named Preset contains a preset value for the field. The Preset attribute may be omitted.

An attribute named Padding specifies information regarding how the field is padded. For example, when this attribute is equal to "R", the field is padded to the right. The Padding attribute may be omitted.

An attribute named CONVERT specifies a data type to which data included in the field should be converted. The CONVERT attribute may be omitted.

FIGS. 3A and 3B demonstrate an example sequence of operations for retrieving data according to the present invention.

The example operations shown in FIGS. 3A and 3B are performed at a query processing unit such as the example query processing unit of FIG. 2 unless otherwise noted.

At receiving operation 302 of FIG. 3A, a query is received. The query may have been received from a client such as any of the example clients of FIG. 1. The query may have any of the properties described above for the client query 126 transmitted by the client of FIG. 1.

The query may include one or more search criteria. A search criterion is any condition which should be satisfied for records included in the result set returned in response to the query. The query may also include one or more unique identifiers or other record identifiers to be returned. The query may also include information on the location of the unique identifier field or other unique key within each record type.

After receiving operation 302 is completed, control passes to generating operation 304.

At generating operation 304, a query is generated. The generated query is configured to retrieve data relevant to the query received at receiving operation 302. The generated query may have any of the properties described above for the intermediate query 128 transmitted by the query processing unit of FIG. 1. Generating operation 304 may be performed at a retrieving unit such as the example retrieving unit of FIG. 2.

Generating operation 304 may analyze the query. Generating operation 304 may then configure the generated query to request data requested by the received query. However, if the received query includes one or more joins, the joins may be omitted from the generated query. If the received query specifies one or more search criteria, the generated query may be configured to include any or all of the search criteria. Generating operation 304 may also perform any of a variety of additional actions performed to fulfill the request specified by the query. In particular, the path through the program code may be adjusted or configured dynamically to achieve the request specified by the query.

In an embodiment of the present invention, generating operation 304 parses the received query. Parsing the received query may remove any joins detected in the received query. The result of the parsing operation is then used as the generated query.

The semantics of queries vary substantially from database to database. Therefore, the subtasks performed by generating operation 304 may be implementation-dependent and may vary significantly depending on the type of database.

In particular, the concept of a query in a z/TPFDF database is substantially different than the concept of a query for a relational database. Queries configured to access a z/TPFDF database are normally implemented by user applications which employ a z/TPFDF API to retrieve and manipulate the data stored at the database. Reading a z/TPFDF database is accomplished by invoking a function named "dfred". Calls to this function may optionally include search parameters. Additionally, opening a subfile in a z/TPFDF database is accomplished by invoking a function named "dfopn". Closing a subfile in a z/TPFDF database is accomplished by invoking a function named "dfcls".

For example, consider the following Structured Query Language (SQL) query configured to access a relational database:
SELECT Field1 FROM Table1

This SQL query could be implemented as a C or assembly language application implementing pseudocode such as the following:

```
file = dfopn("Table1");
while(not end of file) {
    record = dfred(file);
    memcpy(field1, record + field1_disp, field1_len);
}
dfcls(file);
printf(field1);
```

After generating operation 304 is completed, control passes to filtering operation 306.

At filtering operation 306, the query generated at generating operation 304 is configured to retrieve only records matching criteria specified by a query. Specifically, any search criteria included in the query transmitted by the client and received at receiving operation 302 may be added to the query generated at generating operation 304. If the query transmitted by the client and received at receiving operation 302 does not specify search criteria, filtering operation 306 may cause the query generated at generating operation 304 to be unmodified. Filtering operation 306 may be performed at a filtering unit such as the example filtering unit of FIG. 2. After filtering operation 306 is completed, control passes to transmitting operation 308.

In an embodiment as shown in FIG. 3, generating operation 304 and filtering operation 306 are distinct operations. In another embodiment of the present invention, a single operation configures the query to retrieve data relevant to the query received at receiving operation 302 and to include any search criteria included in the query received at receiving operation 302.

In an embodiment of the present invention, filtering operation 306 analyzes the result of the parsing operation performed at generating operation 304. Based on this analysis, additional parameters are configured in the generated query. The parameters may specify search criteria.

In order to avoid ambiguity, the query transmitted by the client and received at receiving operation 302 is hereinafter referred to as the query submitted by the client. Similarly, the query generated at generating operation 304 and filtering operation 306 (or at a composite operation combining both operations) is hereinafter referred to as the generated query.

At transmitting operation 308, the generated query is transmitted to a database. Transmitting operation 308 may be performed at a retrieving unit such as the example retrieving unit of FIG. 2. The retrieving unit then waits until a result of the query is received, a notification of an error condition is received or a timeout of the query occurs. After transmitting operation 308 is completed, control passes to receiving operation 310.

At receiving operation 310, the query transmitted by the retrieving unit is received at a database. Receiving operation 310 may be performed at a database such as the example database of FIGS. 1 and 2. Notably, the database may be a hierarchical database. After receiving operation 310 is completed, control passes to executing operation 312.

At executing operation 312, the query received at receiving operation 310 is executed at the database. The database is the same database described above in regards to receiving operation 310. As a result of executing the query, a single record, a plurality of records or zero records are retrieved from the database.

Each of the retrieved records is categorized into a record type. If multiple records are retrieved, it is not required that all of the records be categorized into the same record type. In other words, the plurality of records may be categorized into a plurality of record types.

Each of the retrieved records comprises a unique identifier field. If the retrieved records are categorized into a plurality of record types, the unique identifier field may be different for each of the record types.

Executing operation 312 may execute the query by reading data located at a storage medium such as the example storage medium comprised by the database server of FIGS. 1 and 2. The retrieved records may be retrieved from the storage medium.

The query received at receiving operation 310 is the generated query. Thus, if filtering operation 306 configured the generated query to include one or more search criteria included in the query received at receiving operation 302, executing operation 312 will retrieve only those records which match the search criteria. In this case, no further action is required to implement the search criteria.

It is noted that some hierarchical databases known in the art, including the z/TPFDF database, implement functionality for applying search criteria to multiple record types. In these databases, even if the generated query is configured to retrieve multiple record types, it may implement search criteria which are applied to all of the record types. Thus, only those records which are applicable to the query submitted by the client are retrieved.

The records retrieved at executing operation 312 may be included in a single subfile included in the database. Moreover, it may be unnecessary to read the entire subfile. In particular, if search criteria are included in the query, any record not matching the search criteria may not be read. It is noted that in some databases, such as the z/TPFDF database, a single subfile of a database may include a plurality of record types. Thus, in these databases, the records may be included in a single subfile even if the records are categorized into a plurality of record types.

The generated query executed at executing operation 310 may be processed using a single pass through the database. To retrieve the records specified by the generated query, it suffices to perform a single pass through all subfiles containing the specified records and to read the relevant records during this single pass. Optimizations, such as ignoring records not matching the search criteria, can only decrease the amount of data which must be read to process the query. This is evident because if an optimization could not be performed on a single pass through the database, the optimization could simply be omitted. Therefore, it is contemplated that the generated query may be processed using a single pass through the database in all cases.

Furthermore, in the example sequence of operations shown in FIG. 3, executing operation 312 is only executed once for each query received at receiving operation 302. Moreover, in the example sequence of operations shown in FIG. 3, operations subsequent to executing operation 310 do not retrieve further data from the database. Therefore, in this case, a query submitted by the client and received at receiving operation 302 may be processed using a single pass through the database. If the records relevant to this query are included in a single subfile, only a single pass through the subfile is required to process the query. Thus, data required to process queries is efficiently retrieved. Moreover, the time required to process queries is in linear proportion to the number of records specified by the search criteria included in each query.

Filtering operation 306 may have caused the generated query to include at least one search criterion included in the query submitted by the client. Executing operation 312 executes the generated query. Therefore, any search criteria included in the generated query are applied to the result of the generated query. Accordingly, in this case, the plurality of records returned by the generated query is filtered to include only records matching at least one criterion specified by the query submitted by the client.

After executing operation 312 is completed, control passes to transmitting operation 314.

At transmitting operation 314, a result set is transmitted to the entity which submitted the query to the database. As previously noted, this entity may be the retrieving unit. The result set includes the records retrieved at executing operation 312. Transmitting operation 314 is performed at the same database described above in regards to receiving operation 310. After transmitting operation 314 is completed, control passes to receiving operation 316.

At receiving operation 316, the result set transmitted at transmitting operation 312 is received from the database. Receiving operation 316 may be performed at a retrieving unit such as the example retrieving unit of FIG. 2. Thus, any records included in the result set are retrieved to the retrieving unit.

Receiving operation 316 may instead receive a notification of an error condition. In this case, receiving operation 316 may notify the client or other system which submitted the query received at receiving operation 302 of the error condition. After transmitting this notification, processing terminates.

Receiving operation 316 may also determine that a timeout of the query occurred. In this case, receiving operation 316 may notify the client or other system which submitted the query received at receiving operation 302 of the timeout. After transmitting this notification, processing terminates.

In the absence of the exception conditions noted above, after receiving operation 316 is completed, control passes to analyzing operation 318.

At analyzing operation 318, metadata about the plurality of records received at receiving operation 316 are analyzed to determine a location of the unique identifier field for each record type included in the received records. Analyzing operation 318 may be performed at an analyzing unit such as the example analyzing unit of FIG. 2.

The metadata may have any or all of the properties described above regarding the example metadata of FIG. 2. Notably, the metadata may be expressed using Extensible Markup Language (XML).

It is emphasized that the unique identifier field may have different field names, be located at different locations, or both for different record types. Thus, analyzing operation 318 may determine the location of the unique identifier field separately for each record type included in the received records.

In an embodiment of the present invention, the client analyzes metadata about a plurality of records to determine a location of the unique identifier field as described above. If the unique identifier field has different field names, is located at different locations, or both for different record types, the location of the unique identifier field may be determined for each record type. The metadata is employed internally to convert requests generated by Java code into requests understandable by program code implementing the present invention. As a result, the query includes an indication of the location of the unique identifier field for each record type. The query may also include the metadata. This query is then submitted by the client and received at receiving operation 302 above. In this case, analyzing operation 318 may extract the location of the unique identifier field from the query instead of analyzing the metadata. If the location of the unique identifier field is specified in the query for each record type returned in response to the query, analyzing the metadata at the analyzing unit included in the query processing unit may be omitted entirely. An implementation of the present invention may elect to specify the location of the unique identifier field in metadata or in the queries depending on the requirements of the implementation.

After analyzing operation 318 is completed, control passes to initializing operation 320 of FIG. 3B.

Turning now to FIG. 3B, at initializing operation 320, a record map is initialized. The record map may have any or all of the properties of the example record map of FIG. 2. The record map initially contains zero entries. However, once populated, it may contain an arbitrary number of entries.

The record map may be located at a storage medium such as the example storage medium comprised by the database server of FIGS. 1 and 2. Thus, initializing operation 320 may initialize the record map by writing to such a storage medium.

After initializing operation 320 is completed, control passes to selecting operation 322.

At selecting operation 322, a record in the result set received at receiving operation 316 which has not yet been processed is selected. After selecting operation 322 is completed, control passes to locating operation 324.

At locating operation 324, the unique identifier field included in the selected record is located. The location of the unique identifier field may be determined based on the result of analyzing operation 318. In an embodiment of the present invention, the unique identifier field is located based on the displacement (e.g., the offset) and the location of the unique identifier field for records having the same record type as the selected record. In another embodiment of the present invention, the unique identifier field is located based on its field name. The value contained in the location thus determined may then be extracted. After locating operation 324 is completed, control passes to determining operation 326.

At determining operation 326, it is determined whether the value contained in the unique identifier field and located at locating operation 324 is included in the record map. Specifically, it is determined whether any entry in the record map has an identifying value equal to the value contained in the unique identifier field. If the record map is located at a storage medium, determining operation 326 may make this determination by reading data located at the storage medium. If the value contained in the unique identifier field is included in the record map, control passes to adding operation 330. If the value contained in the unique identifier field is not included in the record map, control passes to creating operation 328.

At creating operation 328, an entry is created in the record map. An identifying value included in the created entry contains the value contained in the unique identifier field of the selected record. A subset of the selected record is also included in the created entry. The created entry further includes a set of flags. Each flag included in the set of flags corresponds to a record type. Specifically, the set of flags may include a flag for each record type requested by the query received at receiving operation 302. Each flag included in the set of flags is set to the first Boolean value if the selected record is of the type corresponding to the flag and a second Boolean value if the selected record is not of the type corresponding to the flag. In an embodiment of the present invention, the first Boolean value is True and the second Boolean value is False. If the record map is located at a storage medium, creating operation 328 may create the entry by writing to the storage medium. After creating operation 328 is completed, control passes to determining operation 332.

It is emphasized that determining operation 326 and creating operation 328 cause a new entry to be added to the record map upon encountering an identifying value which has not previously been observed in a unique identifier field.

At adding operation 330, an existing entry in the record map which includes the value contained in the unique identifier field of the selected record is modified. Adding operation 330 adds a subset of the selected record to the existing entry. Thus, the existing entry includes a subset of the selected record along with any previously added subsets of other records. Moreover, the flag included in the existing entry and corresponding to the record type of the selected record is set to the first Boolean value. As previously noted, the first Boolean value may be True. The values of other flags included in the existing entry are not modified. If the record map is located at a storage medium, adding operation 330 may create the entry by writing to the storage medium. After adding operation 330 is completed, control passes to determining operation 332.

It is emphasized that creating operation 328 and adding operation 330 cause the selected record, or a subset thereof, to be inserted into an entry in the record map according to the value contained in the unique identifier field.

At determining operation 332, it is determined whether any records included in the result set received at receiving operation 316 have not yet been processed. If at least one record included in the result set has not yet been processed, control passes to selecting operation 322. If all records included in the result set have been processed, control passes to executing operation 334.

It is emphasized that the operations beginning with selecting operation 322 and ending with determining operation 332 result in iteration over each record included in the retrieved plurality of records. For each record for which a value contained in the unique identifier field is not included in a record map, an entry in the record map is created. The created entry comprises the value contained in the unique identifier field, a subset of the record and a set of flags. Each flag included in the set of flags corresponds to a record type. Furthermore, each flag included in the set of flags is set to a first Boolean value if the record is of the type corresponding to the flag and a second Boolean value if the record is not of the type corresponding to the flag. Conversely, for each record for which the value contained in the unique identifier field is included in an existing entry in the record map, a subset of the record is added to the existing entry and the flag included in the existing entry and corresponding to the record type of the record is set to the first Boolean value.

These operations therefore populate the record map. The populated record map can then be employed to make a wide variety of decisions.

It is further emphasized that the operations beginning with selecting operation 322 and ending with determining operation 332 which result in iteration over each record included in the retrieved plurality of records may be performed at a computer.

Moreover, as previously discussed, filtering the plurality of records is achieved by filtering operation 306 and executing operation 312. Iterating over the plurality of records is achieved by the operations beginning with selecting operation 322 and ending with determining operation 332. Thus, in the example sequence of operations shown in FIG. 3, filtering the plurality of records is performed before iterating over each record included in the retrieved plurality of records.

At executing operation 334, the query submitted by the client is executed based on the contents of the record map. Executing operation 334 may analyze all entries in the record map to determine which entries should be included in a result of the query. Executing operation 334 may be performed at a joining unit such as the example joining unit of FIG. 2.

Executing operation 334 may perform any of a variety of types of queries known in the art. In particular, executing operation 328 may perform one or more joins. Specifically, executing operation 334 may perform an inner join. Performing the inner join may comprise outputting the subsets of records included in each entry in the record map for which all flags included in the set of flags contain the first Boolean value. Each record type relevant to the query submitted by the client may be represented by a flag. Therefore, for each identifying value for which all flags corresponding to record types relevant to the query contain the first Boolean value, all of the subsets of records included in the entry for the identifying value are outputted.

Executing operation 334 may also perform an outer join. Performing the outer join may comprise outputting the subsets of records included in each entry in the record map for which at least one flag included in the set of flags contains the first Boolean value. Therefore, for each identifying value for which at least one flag corresponding to a record type relevant to the query contains the first Boolean value, all of the subsets of records included in the entry for the identifying value are outputted.

It is emphasized that for both the inner join and the outer join described above, all records specified by the join conditions included in the query submitted by the client are included in the outputted result. Moreover, if search criteria included in the query submitted by the client were implemented in the generated query, only records matching the search criteria are included in the outputted result. Therefore, the outputted result set includes the joined records matching the search criteria as specified by the query generated by the client.

Moreover, it is emphasized that the example sequence of operations shown in FIG. 3 retrieves records related to a query, given that query and the location of the unique identifier field for every record type relevant to the query.

The present invention generally does not require any particular rules to be followed when designing databases to be queried according to the present invention. In particular, the present invention does not require databases to be normalized. This beneficially allows the present invention to be employed to query databases which were not designed with knowledge of the present invention. Furthermore, flexibility in database design is advantageously facilitated.

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Another aspect of the invention is directed to embodiments that can be embodied in the form of computer-implemented processes and apparatuses for practicing those processes, which is now described with reference to FIG. 4. For example, the computer implemented operations for modeling a computer program are embodied in computer program code executed by computer processors.

Figure 4:
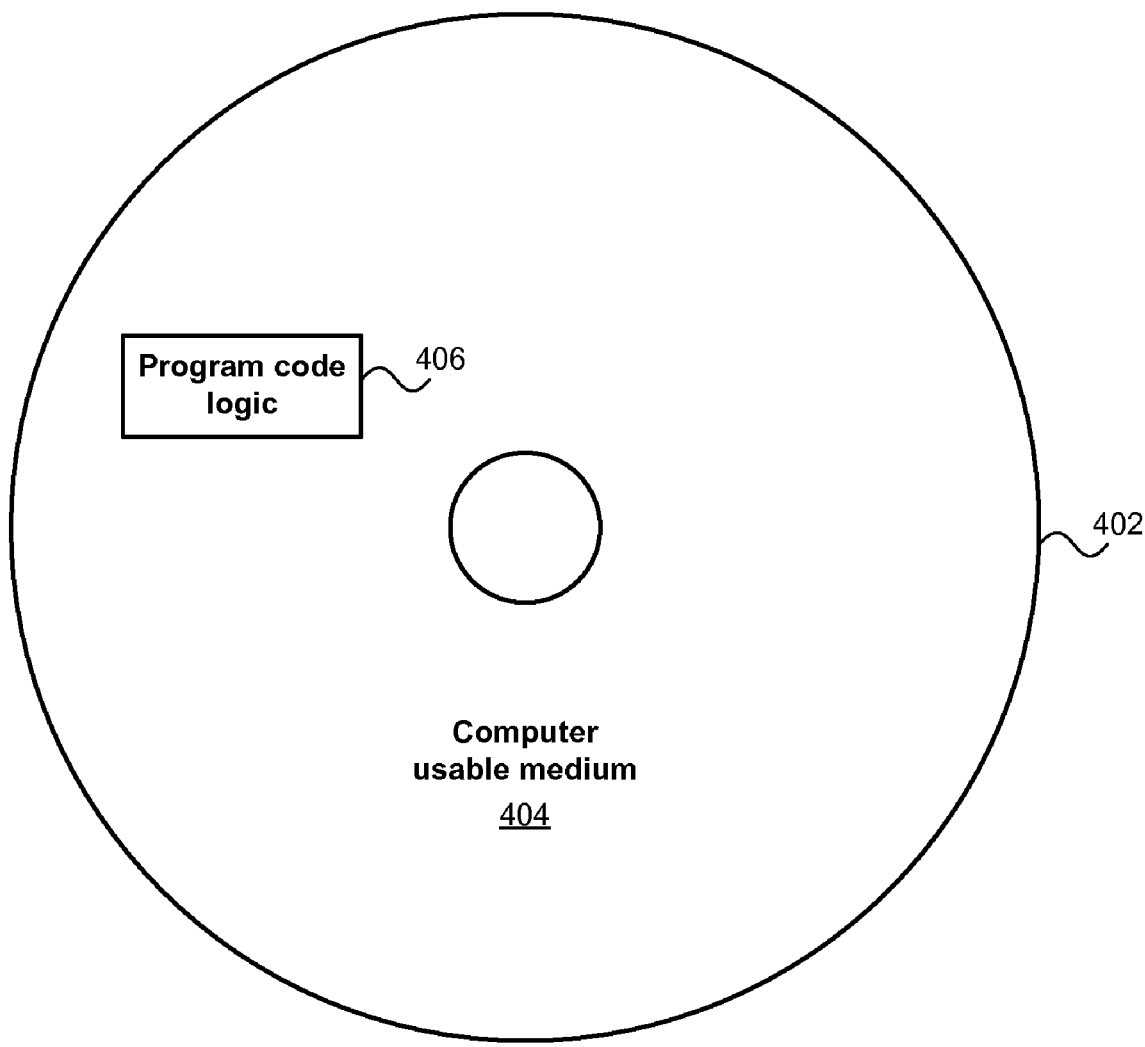
FIG. 4 depicts one embodiment of an article of manufacture incorporating one or more aspects of the invention.

Embodiments include a computer program product 402 as depicted in FIG. 4 on a computer usable medium 404 with computer program code logic 406 containing instructions embodied in tangible media as an article of manufacture. Example articles of manufacture for computer usable medium 404 may include floppy diskettes, CD-ROMs, hard drives, universal serial bus (USB) flash drives, or any other computer-readable storage medium, wherein, when the computer program code logic 406 is loaded into and executed by a computer, the computer becomes an apparatus for practicing the invention.

Embodiments include computer program code logic 406, for example, whether stored in a storage medium, loaded into and/or executed by a computer, wherein, when the computer program code logic 406 is loaded into and executed by a computer, the computer becomes an apparatus for practicing the invention. When implemented on a general-purpose microprocessor, the computer program codes configure the microprocessor to create specific logic circuits.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for retrieving data, the method comprising:
retrieving a plurality of records from a hierarchical database, the plurality of records categorized into a plurality of record types, each record included in the plurality of records comprising a unique identifier field;
iterating over each record included in the retrieved plurality of records, wherein iterating over each record is performed at a computer;
for each record for which a value contained in the unique identifier field is not included in a record map, creating an entry in the record map, the created entry comprising the value contained in the unique identifier field, a subset of the record and a set of flags, each flag included in the set of flags corresponding to a record type, wherein each flag included in the set of flags is set to a first Boolean value if the record is of the type corresponding to the flag and a second Boolean value if the record is not of the type corresponding to the flag; and
for each record for which the value contained in the unique identifier field is included in an existing entry in the record map, adding a subset of the record to the existing entry and setting the flag included in the existing entry and corresponding to the record type of the record to the first Boolean value.

2. The method of claim 1, further comprising performing an inner join, wherein performing the inner join comprises outputting the subsets of records included in each entry in the record map for which all flags included in the set of flags contain the first Boolean value.

3. The method of claim 1, further comprising performing an outer join, wherein performing the outer join comprises outputting the subsets of records included in each entry in the record map for which at least one flag included in the set of flags contains the first Boolean value.

4. The method of claim 1, further comprising filtering the plurality of records to include only records matching at least one criterion specified by a query, wherein filtering the plurality of records is performed before iterating over each record included in the retrieved plurality of records.

5. The method of claim 1, wherein the plurality of records is included in a single subfile included in the database.

6. The method of claim 1, wherein a query is processed using a single pass through the database.

7. The method of claim 1, further comprising analyzing metadata about the plurality of records to determine a location of the unique identifier field.

8. The method of claim 7, wherein the metadata is expressed using Extensible Markup Language (XML).

9. A system for retrieving data, the system comprising:
a retrieving unit configured to retrieve a plurality of records from a hierarchical database, the plurality of records categorized into a plurality of record types, each record included in the plurality of records comprising a unique identifier field;
a record map, the record map containing zero or more entries, wherein each entry stored at the record map comprises an identifying value, a subset of at least one record and a set of flags, each flag included in the set of flags corresponding to a record type; and
a processor configured to:
iterate over each record included in the plurality of records retrieved by the retrieving unit;
for each record for which a value contained in the unique identifier field is not included in a record map, create an entry in the record map, the created entry comprising the value contained in the unique identifier field, a subset of the record and a set of flags, each flag included in the set of flags corresponding to a record type, wherein each flag included in the set of flags is set to a first Boolean value if the record is of the type corresponding to the flag and a second Boolean value if the record is not of the type corresponding to the flag; and
for each record for which the value contained in the unique identifier field is included in an existing entry in the record map, add a subset of the record to the existing entry and set the flag included in the existing entry and corresponding to the record type of the record to the first Boolean value.

10. The system of claim 9, further comprising a joining unit configured to perform an inner join, wherein performing the inner join comprises outputting the subsets of records included in each entry in the record map for which all flags included in the set of flags contain the first Boolean value.

11. The system of claim 9, further comprising a joining unit configured to perform an outer join, wherein performing the outer join comprises outputting the subsets of records included in each entry in the record map for which at least one flag included in the set of flags contains the first Boolean value.

12. The system of claim 9, further comprising a filtering unit configured to filter the plurality of records to include only records matching at least one criterion specified by a query, wherein filtering the plurality of records is performed before iterating over each record included in the retrieved plurality of records.

13. The system of claim 9, wherein the plurality of records is included in a single subfile included in the database.

14. The system of claim 9, wherein a query is processed using a single pass through the database.

15. The system of claim 9, further comprising an analyzing unit configured to analyze metadata about the plurality of records to determine a location of the unique identifier field.

16. A non-transitory computer-readable medium comprising:
computer readable program codes coupled to the non-transitory computer-readable medium for retrieving data, the computer readable program codes configured to cause a computer to:
retrieve a plurality of records from a hierarchical database, the plurality of records categorized into a plurality of record types, each record included in the plurality of records comprising a unique identifier field;
iterate over each record included in the retrieved plurality of records;
for each record for which a value contained in the unique identifier field is not included in a record map, create an entry in the record map, the created entry comprising the value contained in the unique identifier field, a subset of the record and a set of flags, each flag included in the set of flags corresponding to a record type, wherein each flag included in the set of flags is set to a first Boolean value if the record is of the type corresponding to the flag and a second Boolean value if the record is not of the type corresponding to the flag; and for each record for which the value contained in the unique identifier field is included in an existing entry in the record map, add a subset of the record to the existing entry and set the flag included in the existing entry and corresponding to the record type of the record to the first Boolean value.

17. The non-transitory computer-readable of claim 16, wherein the computer readable program codes are further configured to cause the program to perform an inner join, wherein performing the inner join comprises outputting the subsets of records included in each entry in the record map for which all flags included in the set of flags contain the first Boolean value.

18. The non-transitory computer-readable of claim 16, wherein the computer readable program codes are further configured to cause the program to perform an outer join, wherein performing the outer join comprises outputting the subsets of records included in each entry in the record map for which at least one flag included in the set of flags contains the first Boolean value.

19. The non-transitory computer-readable of claim 16, wherein the computer readable program codes are further configured to cause the program to filter the plurality of records to include only records matching at least one criterion specified by a query, wherein filtering the plurality of records is performed before iterating over each record included in the retrieved plurality of records.

20. The non-transitory computer-readable of claim 16, wherein a query is processed using a single pass through the database.

* * * * *